US009785885B1

(12) United States Patent
Boybat Kara et al.

(10) Patent No.: US 9,785,885 B1
(45) Date of Patent: Oct. 10, 2017

(54) ARBITRATION SCHEMA BASED ON A GLOBAL CLOCK

(71) Applicant: International Business Machines Corporation, Armonk, NY (US)

(72) Inventors: Irem Boybat Kara, Zurich (CH); Manuel Le Gallo, Zurich (CH); Abu Sebastian, Adliswil (CH); Tomas Tuma, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/268,061

(22) Filed: Sep. 16, 2016

(51) Int. Cl.
*G06F 15/18* (2006.01)
*G06N 3/02* (2006.01)
*G06N 3/04* (2006.01)

(52) U.S. Cl.
CPC .................. *G06N 3/0454* (2013.01)

(58) Field of Classification Search
None
See application file for complete search history.

(56) References Cited

U.S. PATENT DOCUMENTS

| 5,208,900 | A | * | 5/1993 | Gardner | G06N 3/063 |
| | | | | | 706/42 |
| 8,433,665 | B2 | | 4/2013 | Tang et al. | |
| 2009/0292661 | A1 | | 11/2009 | Haas | |
| 2013/0219103 | A1 | * | 8/2013 | Stark | G06F 13/14 |
| | | | | | 710/317 |
| 2015/0019468 | A1 | | 1/2015 | Nugent et al. | |
| 2015/0170028 | A1 | | 6/2015 | Gupta et al. | |
| 2016/0055409 | A1 | | 2/2016 | Majumdar et al. | |

OTHER PUBLICATIONS

Jo et al. "Nanoscale Memristor Device as Synapse in Neuromorphic Systems", Nano Lett. 2010, pp. 1297-1301.*

* cited by examiner

*Primary Examiner* — Li-Wu Chang
(74) *Attorney, Agent, or Firm* — Scully, Scott, Murphy & Presseer, P.C.; Daniel P. Morris, Esq.

(57) ABSTRACT

A system, method and computer program product for achieving a collective task. The system comprises a plurality of elements representative of a first hierarchy level, each element comprises a plurality of sub-elements. The system comprises also an arbitration module for selecting one of the sub-elements of each element at a point in time based on a global clock, wherein each sub-element relates to one list element of an ordered circular list, and a combination module adapted for a combination of sub-actions performed by a portion of the sub-elements of one of the elements over a predefined period of time, wherein each sub-element performs one of the sub-actions.

21 Claims, 12 Drawing Sheets

ARBITRATION SCHEMA BASED ON A GLOBAL CLOCK

FIELD OF THE INVENTION

The present disclosure relates generally to a system for achieving a collective task, and more specifically, to a system for achieving a collective task, wherein the system comprises a plurality of elements, wherein each element comprises a plurality of sub-elements. The present disclosure relates further to a related method for achieving a collective task, and a computer program product.

BACKGROUND

The more complex problems to be solved become, the higher rises the chance that the problem may be solvable using a large collection of elements instrumental in solving the related task.

Examples may be an artificial neural network with a plurality of neuronal and synaptic elements. One of such synaptic element could be represented by a collection of synaptic sub-elements. Other examples may be an information storage system with a large plurality of storage elements, a large plurality of sensors and actuators in an IoT (Internet-of-Things or Industry 4.0) environment, or a collection of robots collectively performing a certain task. In case of an information storage system, each storage element could comprise multiple storage sub-elements.

The underlying problem is very often a common problem: how to synchronize the different activities of the plurality of elements. Sometimes, the elements are divided into sub-elements. In this case, a proper synchronization becomes even harder. In other words, in the above-mentioned examples, it may be essential to develop an arbitration scheme by which each individual sub-element is selected and enabled to contribute to the overall functionality of the element in the network.

There are several disclosures related to a method for achieving a collective task. Document US 20160055409 A1 proposes a method of selecting/classifying individual sub-elements (objects) for a large number of elements (objects) for a system like a storage system sensor network, neuronal network, etc. The method also discloses applying multiple confidence values for multiple objects.

Document US 20150019468 A1 discloses a method of grouping sub-elements for a large number of elements for a system including a modification of adaptive synaptic weights according to anti-hebbian and hebbian plasticity, wherein the adaptive synaptic weights are configured in form of a differential pair of memristors.

One disadvantage of known technology is a missing synchronization of the sub-elements in order to optimize the functioning of the network system. One approach may be to operate all of the sub-elements in parallel or use an aggregate for the main behavior. There are some approaches where the sub-elements are selected randomly with the use of an in-built pseudorandom number generator for elements. Both of these approaches increase the level of complexity and unpredictability.

Thus, there may be a need to overcome the limitations of the known technology and provide technology allowing a proper synchronization and arbitration of sub-elements in order to enable a system of elements achieving a common task.

SUMMARY

According to one aspect, there is provided a system for achieving a collective task. The system comprises a plurality of elements, wherein each element comprises a plurality of sub-elements. The system may also comprise an arbitration module for selecting one of the sub-elements of each element at a point in time based on a global clock, wherein each sub-element relates to one list element of an ordered circular list, and a combination module adapted for a combination of sub-actions performed by a portion of the sub-elements of one of the elements over a predefined period of time, wherein each sub-element may perform one of the sub-actions.

According to another aspect, there is provided a method for achieving a collective task. The collective task may be achieved with a plurality of elements. Each element may comprise a plurality of sub-elements. The system may comprise selecting one of the sub-elements of each element at a point in time based on a global clock, wherein each sub-element may relate to one list element of an ordered circular list, and combining sub-actions performed by a portion of the sub-elements of one of the elements over a predefined period of time, wherein each sub-element may perform one of the sub-actions.

It may be noted that the plurality of elements may be a large plurality of elements.

The system and method for achieving a collective task may offer multiple advantages and technical effects:

Firstly, it is not focused on a single kind of elements or application area. The system and method abstracts, i.e., is independent from the underlying physical element. Therefore, a large number of different element types may be controlled by the proposed method and system to achieve a common task. Swarm like systems, as well as networked systems, comprising nearly any kind of element, may be coordinated in a way to achieve a common task. The global clock in combination with the ordered circular list may point to the sub-elements or a set of sub-elements in a coordinated way to achieve the overall common task. On one hand side, the usage of the ordered circular list together with the global clock may be relatively simple to implement. On the other hand, it becomes evident that the proposed approach may be a very powerful instrument in order to coordinate a large plurality of elements for achieving a common task. It may overcome the disadvantages of randomly selected elements using built-in pseudorandom number generators per element and thus, overcomes the required, increased system-level complexity of such solutions.

The combination module may be instrumental in representing a single response of the collective sub-actions of the sub-elements for the entire element. Because a certain period of time is used to combine sub-results of the sub-actions of the sub-elements, different algorithm for a combination may be used: a sum value, an average value, a median value, a peak value, the lowest value of the results of sub-elements or any other combination. Also possible may be that the results of the sub-elements get a certain weight value assigned such that the averaging may be a weighted average.

In the following, additional embodiments of the system for achieving a collective task and the related method will be described. It may be noted that aspects of the embodiments are applicable for both, the system and the method.

According to one embodiment of the system, the element may be a synaptic element of a neural network. Consequently, the sub-elements may be partial synaptic elements, which activities may be synchronized by the arbitration module in order to enable a more accurate representation of the synaptic behavior.

According to one embodiment of the system, the sub-element may be a memristor. Hence, the arbitration module may coordinate the memristors of, e.g., a synaptic element. Using multiple memristors to simulate a synaptic element may increase the dynamic range and may introduce a more linear increase and decrease in the synaptic weight. This may allow higher performing neural networks.

According to one embodiment of the system, the memristor may be selected from the group consisting of: a phase change memristor, an electro-ionic memristor and a spintronic memristor. Thus, the system and method may not be limited to one kind of memristor. This may be a consequence of the fact that the system and method is not limited to storage systems at all. It may also be applied to other systems comprising elements based on sub-elements to achieve a common task. Consequently, all kinds of storage elements and storage sub-elements may be part of the proposed system. Therefore, by using various memristive technologies, scalability, areal density, low power consumption may be achieved.

According to one advantageous embodiment of the system, the collective task may store a synaptic weight of the synaptic element of a neural network. Based on the fact that neural networks are bio-inspired computing architectures which comprise a plurality of neurons and synaptic elements, the role of the synaptic element is to interconnect to neurons in a plastic way and to retain the "learned" experience weight.

According to an embodiment of the system, a number of the ordered list of elements in the ordered circular list and an increment rate for the ordered circular list may relate to each other in such a way that during consecutive iterations of selections at least one selected sub-element may be different. Such an algorithm may work in both cases: (i) in each iteration one sub-element may be selected, (ii) in each iteration several sub-elements may be selected—in particular, a predefined group of sub-elements. The increment rate may ensure that during consecutive iterations always different sub-elements or groups of sub-elements may be selected. This may help to ensure that an equal distribution of selected sub-elements may be achieved over time.

According to one embodiment of system, a total number of sub-elements of the elements may be equal for each element. Consequently, the global clock and the arbitration scheme may be applicable for all elements in the same way. Hence, each element may be treated similarly. In general, all elements may behave in the same way. No special treatments may be required for individually different elements. Additionally, also the sub-elements per element may be identical. This allows for good scalability of the proposed system, and the arbitration module and the method.

According to one additionally advantageous embodiment of the system, a total number of list elements in the ordered circular list may be coprime to an increment rate of the ordered circular list. Thus, the total number of list elements and increment rate may not have a common divider. This may ensure that always different sub-elements may be addressed and selected by the arbitration module at each clock tick of the global clock.

According to one additionally advantageous embodiment of the system, a total number of elements in network may be co-prime to the total number of list-elements in ordered circular list. They may further reduce the risk that identical sub-elements may be selected too often in comparison to other sub-elements. The method and the system may be performed in a good manner with an equal distribution if selected sub-elements.

According to one embodiment of the system, the element may be a robot. Hence, a swarm of robots may be coordinated using the system or method to achieve a common task by the plurality of robots. Because the proposed system and method is not linked to a special type of element also these types of elements and sub-elements may be selected.

Hence, the element may alternatively be a storage element in a storage system comprising a large plurality of storage elements which are each dividable into a plurality of sub-storage-elements. One advantage of this is that not only conventional addressable storage systems may be supported by the proposed system but also content addressable memory systems may be controlled by the proposed system.

According to one further advantageous embodiment of the system, the element may be a sensor, which may again be composed of a plurality of sub-sensor-elements. With this, large IoT networks may be managed advantageously by the use of the proposed system in a controlled, adaptive and scalable manner.

Another embodiment of the method ensures that a clock speed of the global clock may be higher than the speed of an underlying sub-action of the sub-element. This may ensure that the same sub-element may not be selected within two consecutive clock cycles. Hence, each two consecutive clock cycles may address different sub-elements. For example: If a write clock for storage sub-elements may be higher than the global clock, there may be a chance that during two write clock cycles the same sub-element may be selected because the global clock may not be advanced pointing to another sub-element. Such a scenario would have to be avoided.

Furthermore, embodiments may take the form of a related computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

BRIEF DESCRIPTION OF THE SEVERAL VIEWS OF THE DRAWINGS

It should be noted that embodiments herein are described with reference to different subject-matters. In particular, some embodiments are described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above and further aspects of the present disclosure are apparent from the examples of embodiments to be described hereinafter and are explained with reference to the examples of non-limiting embodiments.

Figure 1:
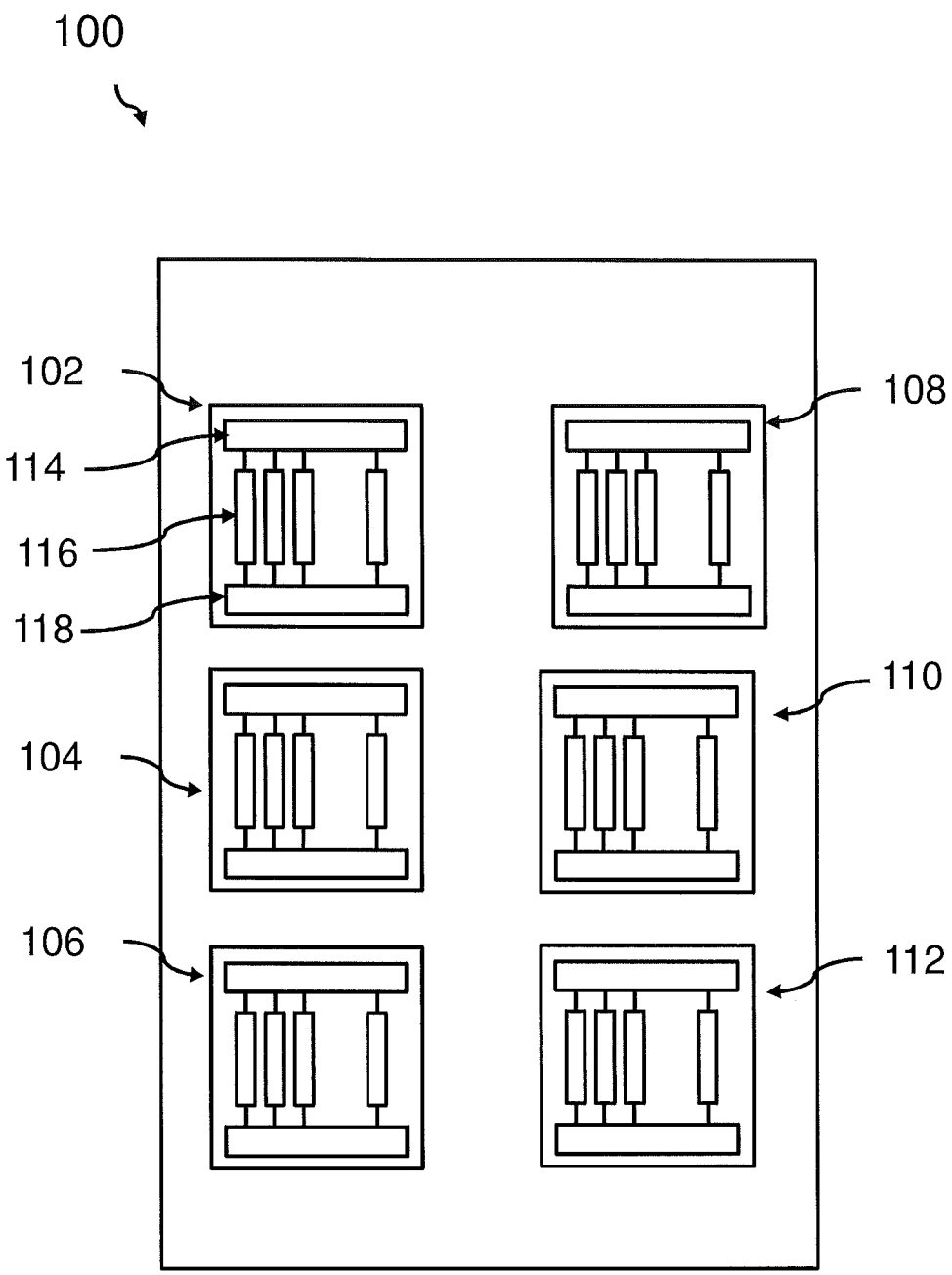

Preferred embodiments will be described, by way of example only, and with reference to the following drawings:

FIG. 1 shows a block diagram of an embodiment of the inventive system for achieving a collective task.

Figure 2:
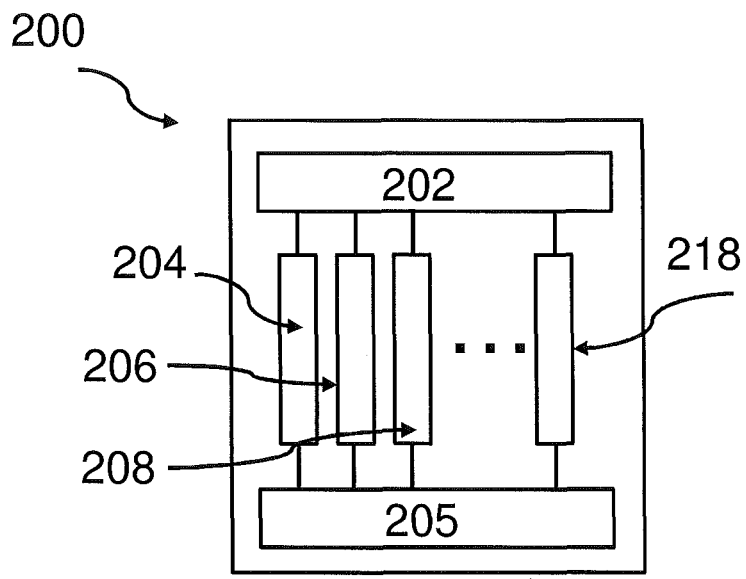

FIG. 2 shows a block diagram of an embodiment of one element.

Figure 3:
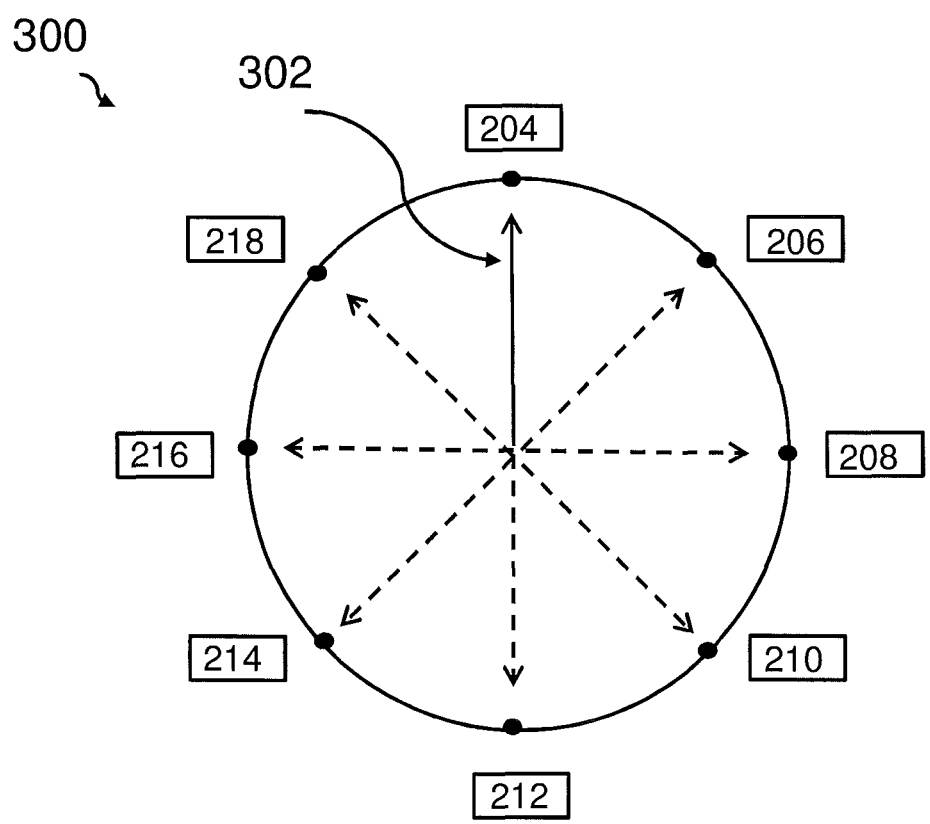

FIG. 3 shows a block diagram of an embodiment of a circular list relating to sub-elements.

Figure 4:
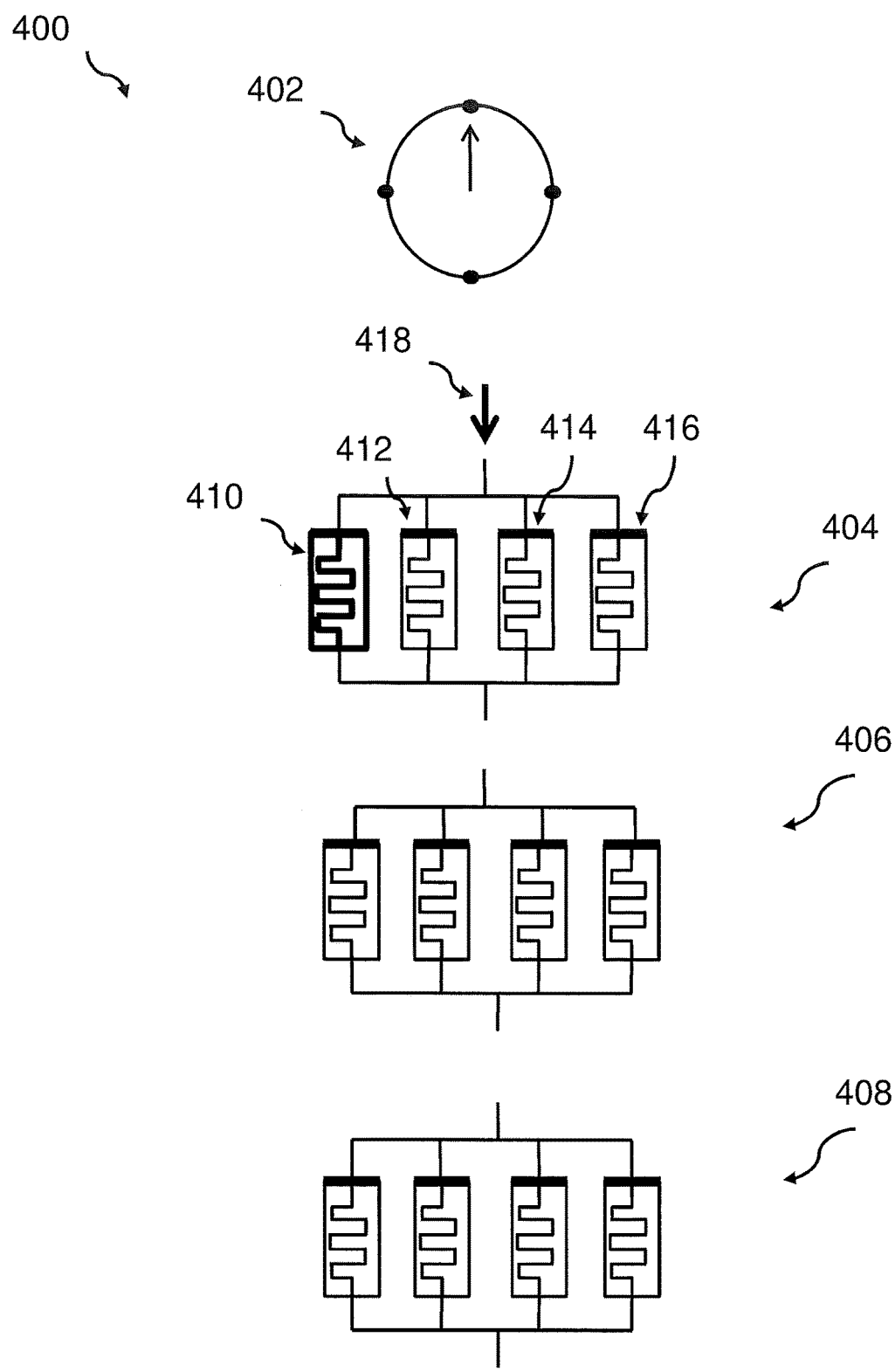

FIG. 4 shows a block diagram of an embodiment of a circular list relating in a first status pointing to the first selected sub-element.

Figure 5:
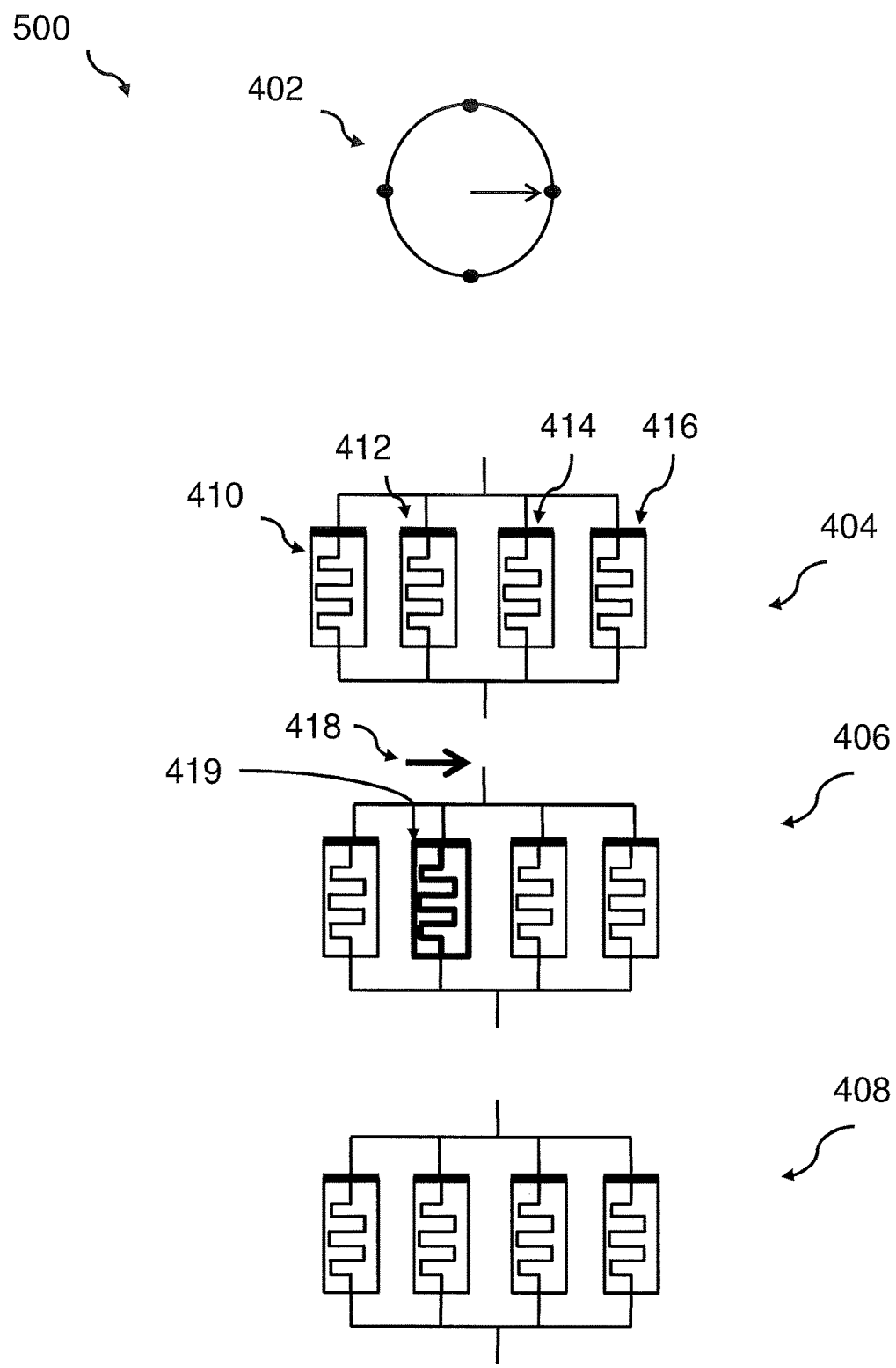

FIG. 5 shows a block diagram of an embodiment of a circular list relating in a second status pointing to the second selected sub-element.

Figure 6:
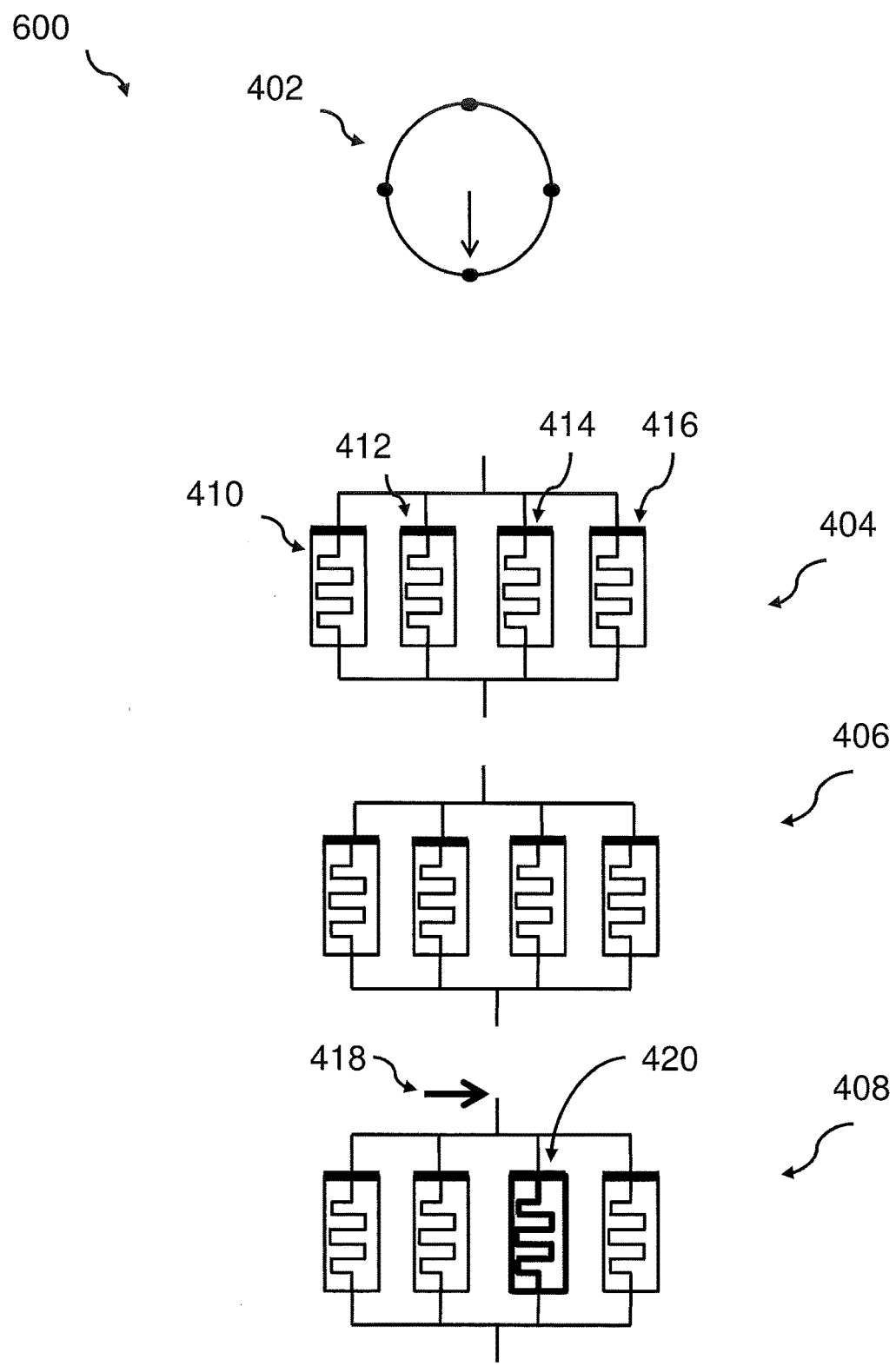

FIG. 6 shows a block diagram of an embodiment of a circular list relating in a third status pointing to the third selected sub-element.

Figure 7:
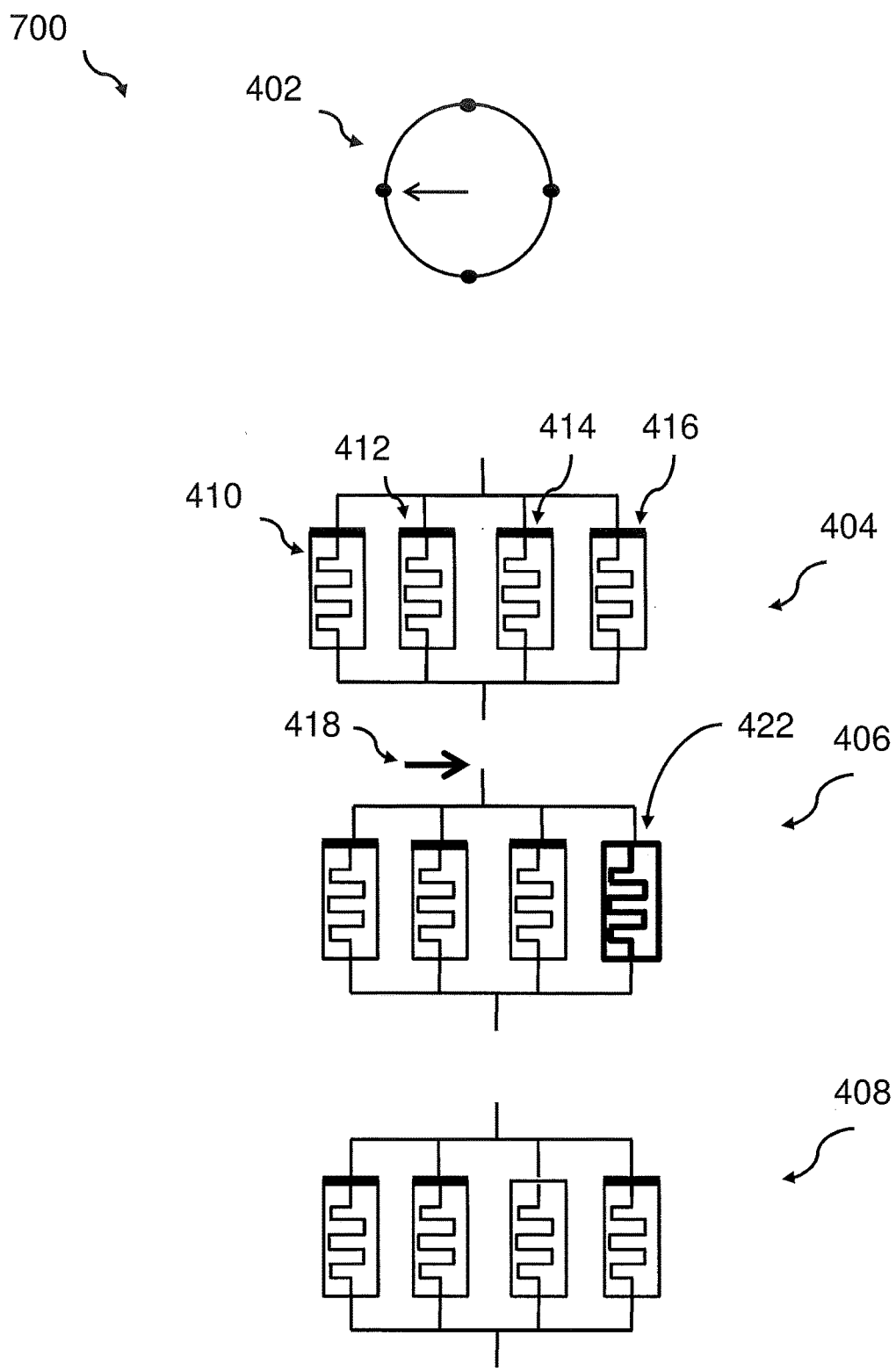

FIG. 7 shows a block diagram of an embodiment of a circular list relating in a fourth status pointing to the fourth selected sub-element.

Figure 8:
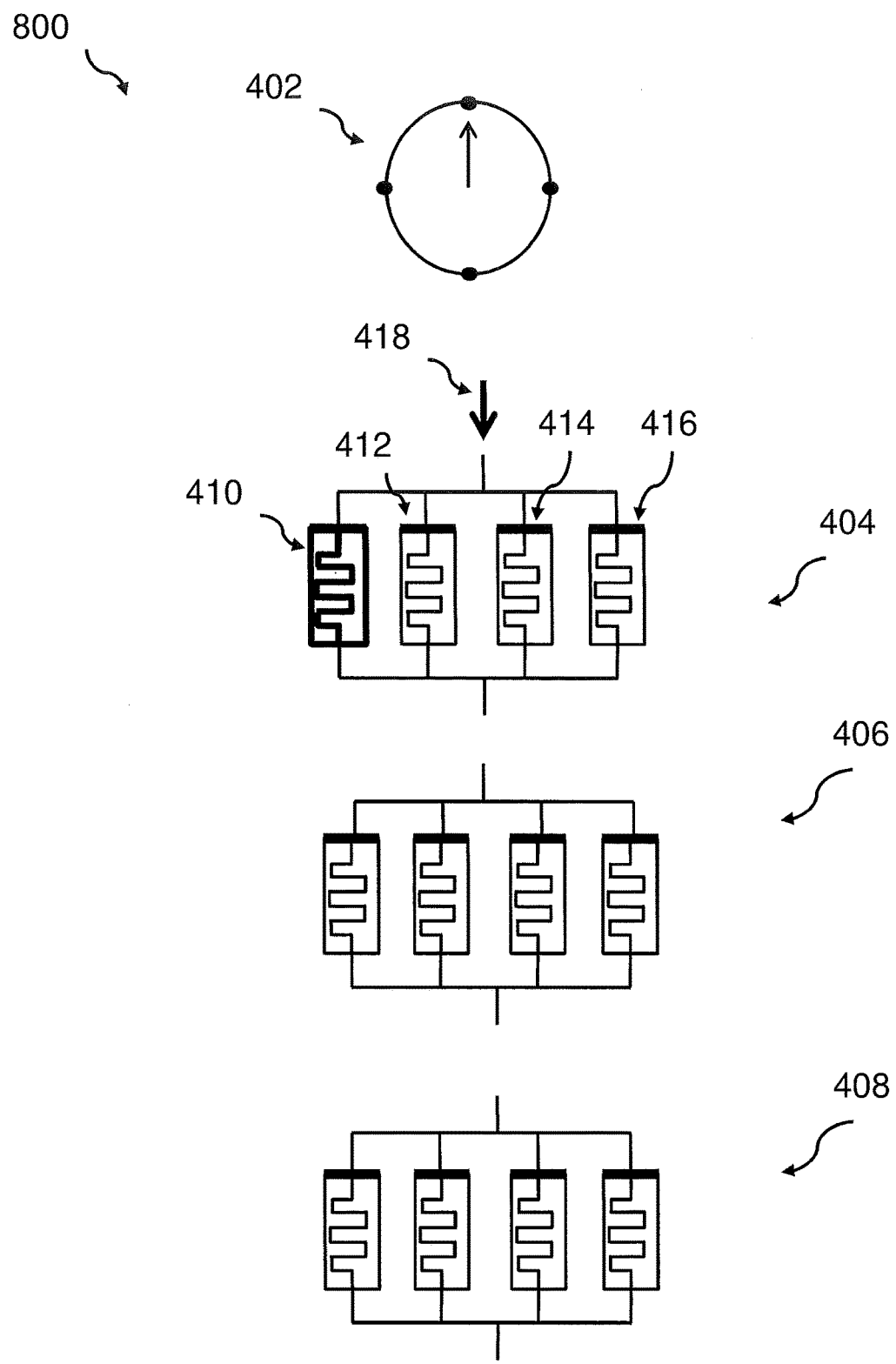

FIG. 8 shows a block diagram of an embodiment of a circular list relating in a fifth status pointing to the fifth selected sub-element.

Figure 9:
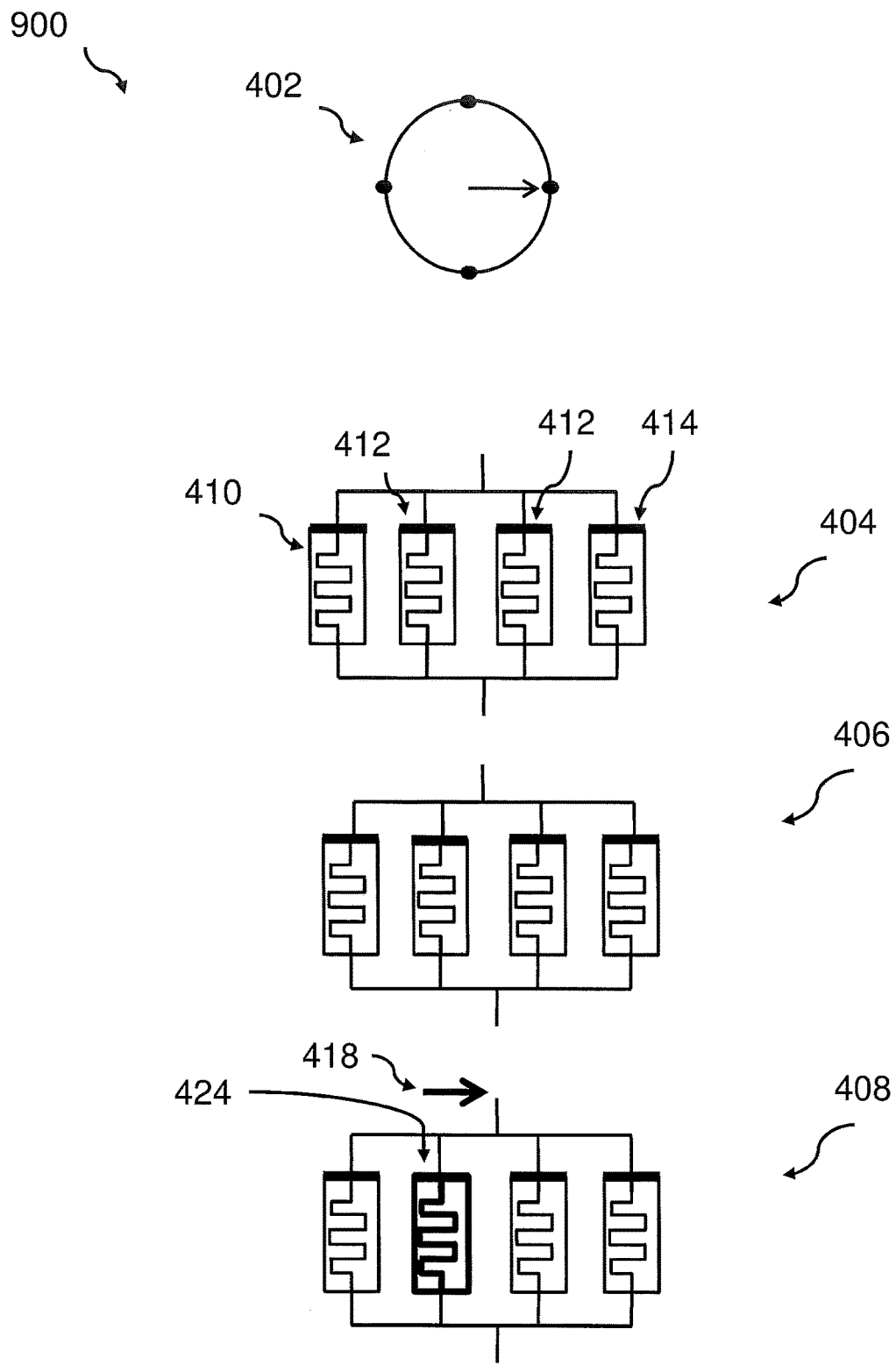

FIG. 9 shows a block diagram of an embodiment of a circular list relating in a sixth status pointing to the sixth selected sub-element.

Figure 10:
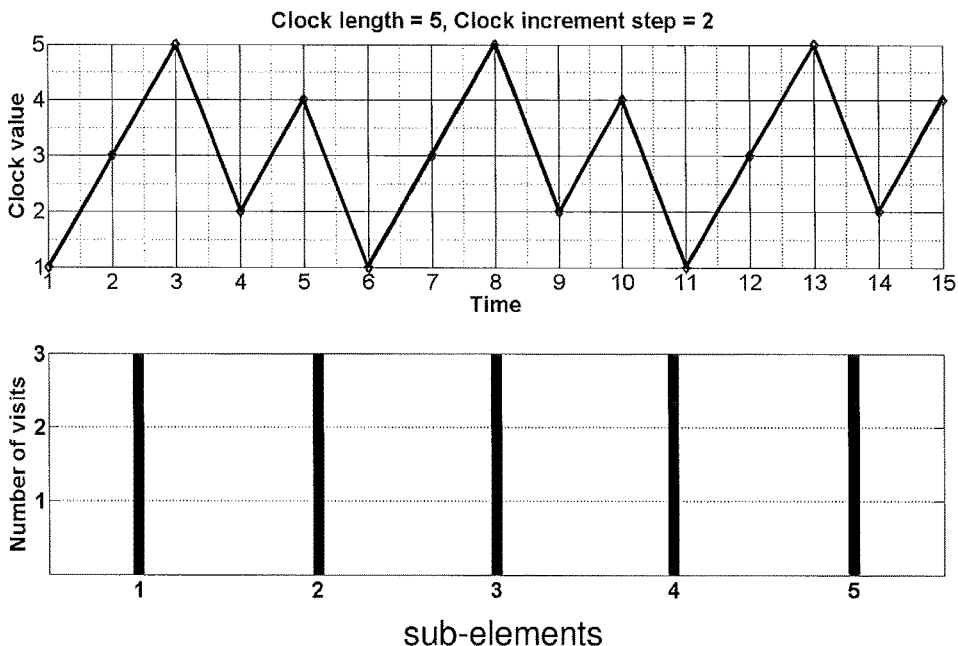

FIG. 10 shows a diagram of an addressing of sub-elements at different points in time as well as a number of sub-elements addressed.

Figure 11:
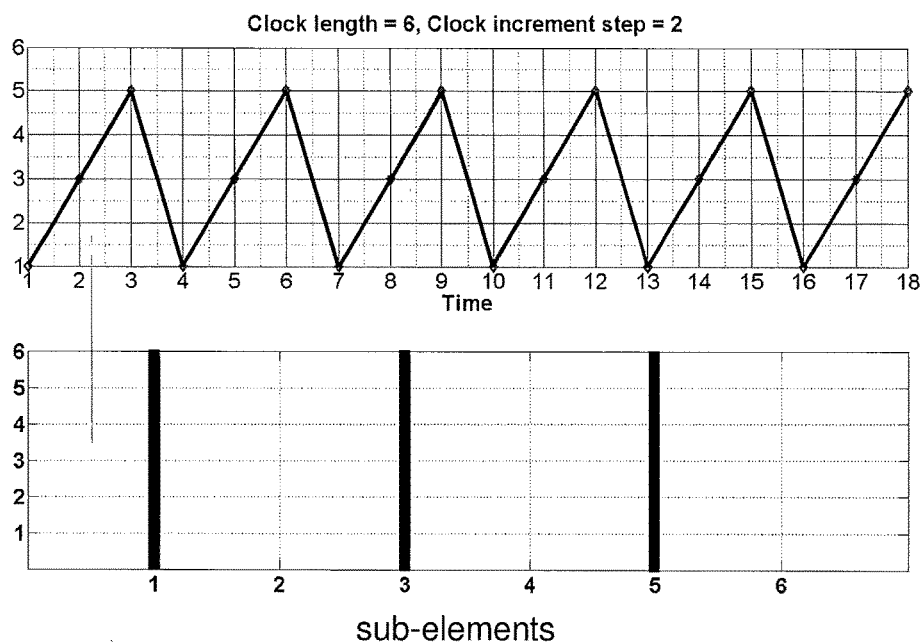

FIG. 11 shows a diagram of another addressing of sub-elements at different points in time as well as a number of sub-elements addressed.

Figure 12:
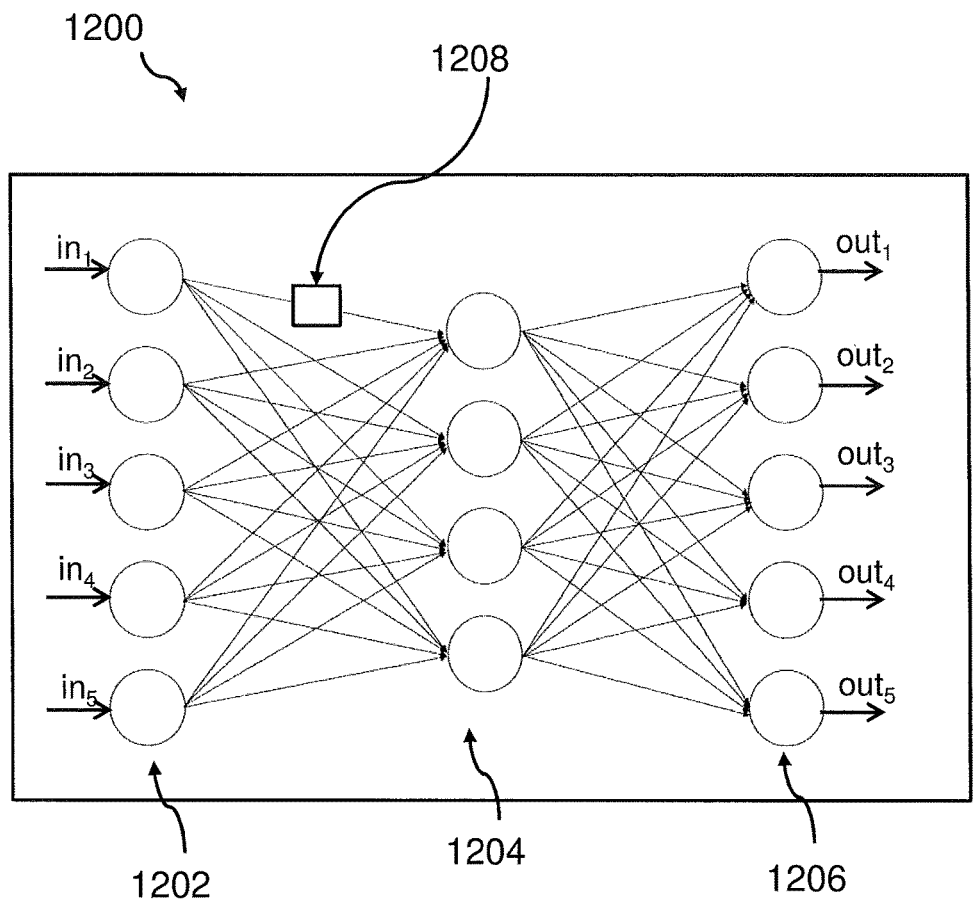

FIG. 12 shows a block diagram of a neural network.

Figure 13:
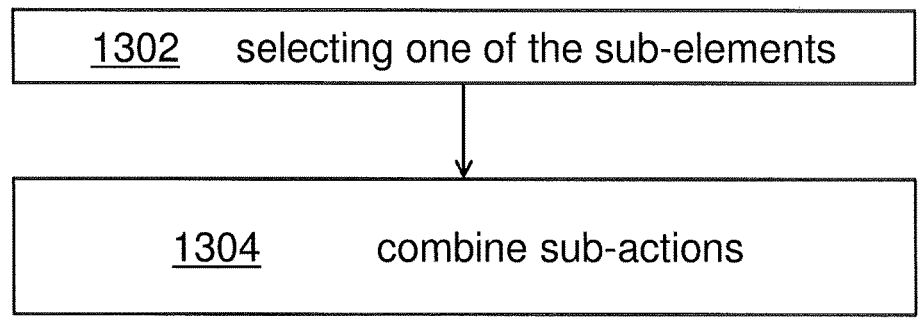

FIG. 13 shows a block diagram of an embodiment of the inventive method for achieving a collective task.

Figure 14:
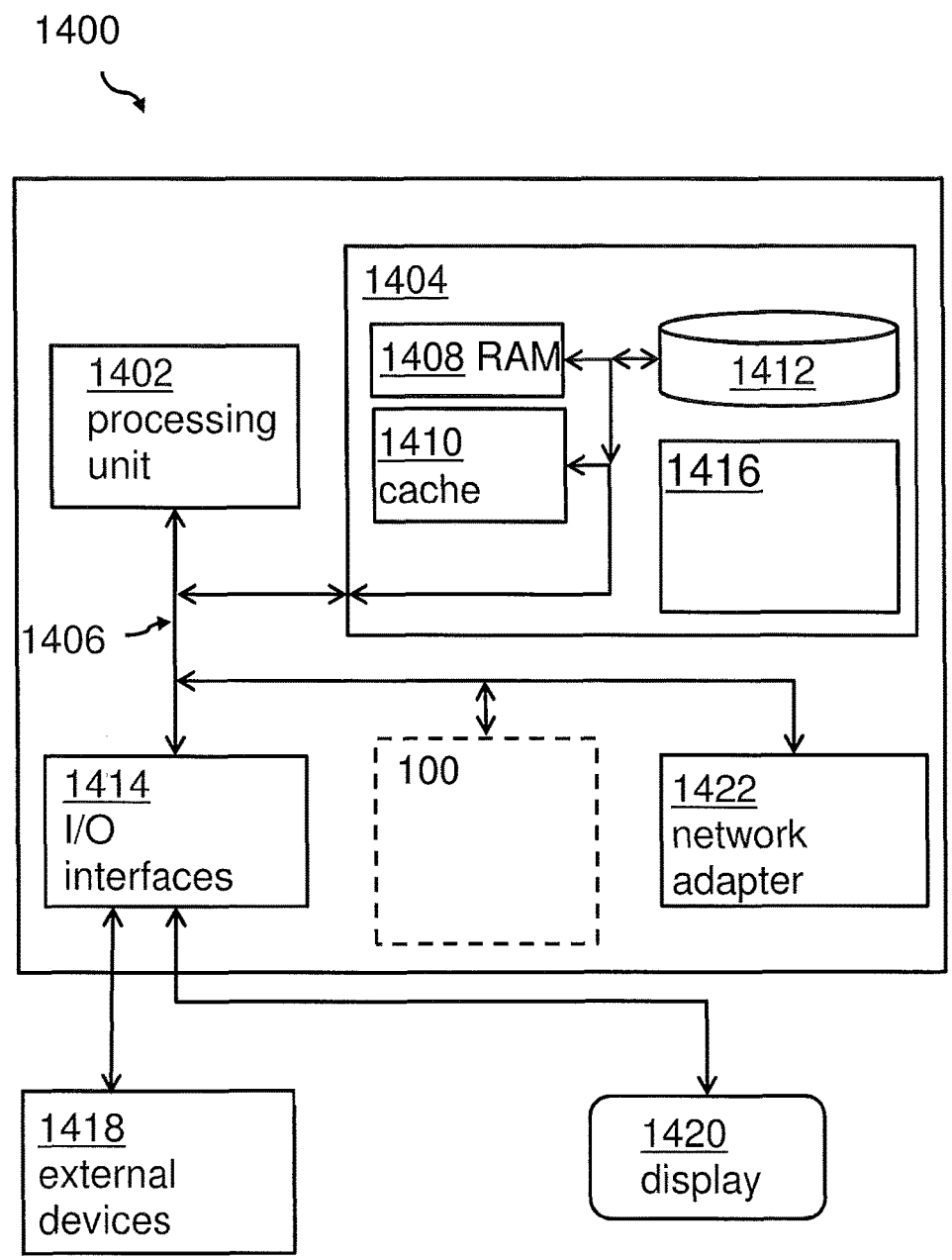

FIG. 14 shows a block diagram of a computing system comprising the system for achieving a collective task.

DETAILED DESCRIPTION

In the context of this description, the following conventions, terms and/or expressions may be used:

The term 'system' may denote any organized number of elements using any kind of dependency in order to achieve a common task for the plurality of elements. The elements may, e.g., be synaptic elements in the neural network, robots, or storage elements in a storage system or other elements organized to achieve a common goal. As can be seen from these examples, the elements may be linked to each other by a fixed or configurable network or may be coordinated as a swarm. The proposed method may be applicable to systems of any kind. The system may also comprise a coordination or arbitration component and a module for combining sub-actions of sub-elements.

The term 'collective task' may denote a goal or an objective that may have to be achieved by a group of elements which may be part of a system. Hence, all activities and sub-activities may be directed to support the achievement of the common goal, directly or indirectly.

The term 'elements' may denote a portion of the system for achieving the common or collective tasks. An element may be divided into sub-elements which may be enabled to contribute individually to the achievement of the collective goal.

The term 'arbitration module' may denote a functional unit enabled to address and/or activate elements and/or sub-elements individually in order to achieve the collective goal. The arbitration module may ensure that the sub-elements may be addressed in a coordinated way in order to achieve the collective goal in an efficient way.

The term 'combination module' may denote a unit adapted to collect and combine individual results of the sub-elements of the elements in order to achieve the collective goal. Also here may apply that the combination module may coordinate and collect the sub-results from the sub-elements in a way to efficiently support the collective goal.

The term 'sub-actions' may denote a single action of a single sub-element. If, e.g., the system comprises a swarm of robots, a sub-action may be performed by one single robot or a part thereof.

The term 'synaptic element' may denote a unit used in a neural network which may be understood as a bio-inspired computing architecture that may comprise a plurality of neuronal and synaptic elements. The role of the synaptic element may be to interconnect two neurons in a plastic way and retain a "learned" experience weight.

The term 'memristor'—basically, a portmanteau of a memory resistor—may denote a hypothetical non-linear passive two-terminal electrical component relating electric charge and magnetic flux linkage. According to the characterizing mathematical relations, the memristor would hypothetically operate in the following way: The memristor's electrical resistance is not constant but depends on the history of current that had previously flowed through the device, i.e., its present resistance depends on how much electric charge has flowed in what direction through it in the past. The device remembers its history, the so-called non-volatility property. When the electric power supply is turned off, the memristor remembers its most recent resistance.

The term 'phase change memristor' (PCM) may denote a type of non-volatile random-access memory. Some of them exploit the unique behavior of chalcogenide glass. In PCM heat produced by the passage of an electric current through a heating element, generally made of TiN, could be used to either quickly heat and quench the glass, making it amorphous, or to hold it in its crystallization temperature range for some time, thereby switching it to a crystalline state. A PCM also has the ability to achieve a number of distinct intermediary states, thereby having the ability to hold multiple bits in a single cell.

The term 'electro-ionic memristor' may denote a memristor implemented as an electrochemically controlled hybrid ionic-conducting polymeric device The term 'spintronic memristor' may denote a memristor based on changing a spintronic memristor's resistance state based on a magnetization to alter the spin direction of electrons in two different sections of a device. Two sections of different electron spin directions are kept separate based on a moving "wall", controlled by magnetization, and the relation of the wall dividing the electron spins is what controls the devices' overall resistance state.

The term 'synaptic weight' may denote—in neuroscience and computer science—an adaptive strength or amplitude of a connection between two nodes, corresponding in biology to the amount of influence the firing of one neuron has on another. The term is typically used in artificial and biological neural network research.

The term 'increment rate' or clock increment rate may denote an amount of change in the global clock position or global clock pointer after an operation or an independent update signal.

The term 'clock length' of the global clock may denote a number of sub-elements organized in the global clock, i.e., the length of the circular list.

The term 'clock frequency' of the global clock may denote the speed of change in the clock position of the global clock. If, e.g., the global clock may be incremented after each write operation of a memristor, the clock frequency may depend on the write frequency. The clock frequency may also be adjusted independently.

In the following, a detailed description of the figures will be given. All instructions in the figures are schematic. Firstly, a block diagram of an embodiment of the inventive system for achieving a collective task is given. Afterwards, further embodiments, as well as embodiments of the method for achieving a collective task will, be described.

FIG. 1 shows a block diagram of an embodiment of the system 100 for achieving a collective task. Generally, any system of elements independent of the type of element is possible. The only framing condition is that all elements follow a collective goal. The system 100 comprises a plurality—in particular, a large—plurality of elements, 102, 104, 106, 108, 110, 112 which represent a first hierarchy level. It may be noted that the six shown elements do not really represent a large number of elements or sub-elements. However, they may represent the large number of elements which may actually comprise hundreds or thousands of elements.

Each element 102, . . . , 112 comprises a plurality of sub-elements 116 which may represent a second hierarchy level. The system 100 also comprises an arbitration module 114 for selecting one of the sub-elements of each element at a point in time based on a global clock. Each sub-element relates to one list element of an ordered circular list. The system also comprises a combination module 118 adapted for a combination of sub-actions which are performed by the sub-elements for reaching the joint, common and/or collective goal. The combination may choose from different combination techniques, like averaging, summation, taking the median, taking the highest or the lowest value, or using a weighted average, etc.

The sub-actions may be performed by a portion, i.e., a subset of all sub-elements of an element or, by all of the sub-elements of one of the elements over a predefined period of time, wherein each sub-element performs one of the sub-actions at a time. Because the elements 102, . . . , 112 are assumed to be equal, reference numerals 114, 116, 118 are only shown for element 102.

FIG. 2 shows another block diagram of an embodiment of an element 200. Basically, the element 202 is assumed to be identical to any of the elements 102, . . . , 112 of FIG. 1. It is shown here again as a reference for FIG. 3. The element 200 comprises the arbitration module 202, a plurality of sub-elements 204, 206, 208, . . . , 218, as well as the combination module 205. The right-most supplement is shown with reference numeral 218 assuming that eight sub-elements may be present. However, the real number of sub-elements per element 200 may generally be unlimited, e.g., thousands of elements.

FIG. 3 shows a block diagram of an embodiment of a circular list 300 relating to elements 204, . . . , 218. A pointer 302 of the circular list 300 points to one of the sub-elements 204, . . . , 218 at each point in time. The sub-element, to which the pointer 302 points to, may be called the selected sub-element. As long as the pointer 302 points to a selected sub-element, the sub-element performs the related sub-task. Generally, the circular list may have any number of sub-elements to work with. It may be noted that the pointer—or a group of pointers—may point to more than one of the sub-elements at a time. In such a case, the selected group of sub-elements may each perform its sub-task or sub-action.

FIG. 4 shows a block diagram 400 of an embodiment of a circular list 402 in a first status pointing to the first selected sub-element. In the chosen example, each element 404, 406, 408 may comprise four sub-elements. The first element 404 comprises the sub-elements 410, 412, 414 and 416. As shown, the pointer of the circular list 402 points upwards and addresses sub-element 410, shown with bold lines. As an example only, the sub-elements of the elements 404, 406, 408 are shown as memristors. Line 418 represents the input line from the arbitration module 202. As shown in FIG. 2 the output side of the memristors may be connected to the combination module 205. As can be seen, in this first status only one sub-element, namely sub-element 410, may be addressed from any of the elements 404, 406, 408.

FIG. 5 shows a block diagram 500 of an embodiment of a circular list 402 relating in a second status pointing to the second selected sub-element. Here, the pointer of the circular list 402 points to the right side. In this case, sub-element 419—shown with bold lines—of the second element 406 may be selected. It may be noted that the advance of the circular list 402 pointer may be related to a global clock.

FIG. 6 shows a block diagram 600 of an embodiment of a circular list 402 relating in a third status pointing to the third selected sub-element. In this case, the pointer points downwards, addressing a third sub-element, in this case, sub-element 420 of element 408.

FIG. 7 shows a block diagram 700 of an embodiment of a circular list 402 relating in a fourth status pointing to the fourth selected sub-element. In this next clock cycle of the circular list 402, the pointer points to the left direction selecting sub-elements 422 of element 406.

FIG. 8 shows a block diagram 800 of an embodiment of a circular list 402 relating in a fifth status pointing to the fifth selected sub-element. In this position, the point of the circular list 402 points to the sub-elements 410 of element 404.

FIG. 9 shows a block diagram 900 of an embodiment of a circular list 402 relating in a sixth status pointing to the sixth selected sub-element. In this exemplary status, the pointer of the circular list 402 points to sub-element 424 of element 408.

The sequence of sub-elements addressed depends on the clock length and increment step of the global clock. The shown selected sub-element sequence is only one example of many possibilities of selecting sub-elements of elements.

FIG. 10 shows a diagram 1000 of an addressing of sub-elements at different points in time as well as a number of sub-elements addressed. In this example, a global clock length of 5 may be chosen—relating to 5 sub-elements—and a clock increment step of 2. Initially, at a first point in time "1", the pointer points to the "$1^{st}$" sub-element. In a next step (increment=2), the pointer addresses the "$3^{rd}$" sub-element. At a next increment at a "$3^{rd}$" point in time of the global clock, the pointer may point at the "$5^{th}$" sub-element, and so on and so on. The lower half of FIG. 10 indicates in a bar graph how often each sub-element of the 5 sub-elements may be selected. The vertical axis "number of visits" indicates the number of selections of each sub-element. As it turns out, each sub-element is selected three times for the shown 15 cycles of the pointer of the circular list. Thus, an equal number of selections may be made given the clock length and the clock increment.

FIG. 11 shows an alternative diagram 1100 of an addressing of sub-elements at different points in time as well as a number of sub-elements addressed. In this case, the clock length is 6 and the clock increment is 2. Such an embodiment of the circular list 402 would be chosen if 6 sub-elements may be present for a given element. In this case, clock length and clock increment are chosen the way that sub-elements 2, 4, 6 may never be selected. Hence, —as discussed above it is instrumental for a well-functioning circular list for selecting sub-elements that the total number of list elements—i.e., the number of addressable sub-elements—in said ordered circular list 402 is coprime to an increment rate or clock increment for said ordered circular list. Hence, the here shown example is not working as required.

FIG. 12 shows a block diagram of a neural network 1200. The exemplary artificial neural network is shown with 5 input lines $in_1$, $in_2$, $in_3$, $in_4$, $in_5$ and 5 output lines $out_1$, $out_2$, $out_3$, $out_4$, $out_5$. The input lines are connected to 5 inbound neuron elements 1202, whereas the five output lines $out_1$, . . . $out_5$ are connected to 5 outbound neuron elements 1206. In between, another set of four intermediate neuron elements 1204 are shown. Different neuron network elements 1202, 1204, and 1206 are connected via lines. Each line may represent a synaptic element, of which only synaptic element 1208 is shown explicitly. Each of the plurality of synaptic elements 1208 may be implemented as one of the elements as shown in FIG. 2, or FIG. 4 to FIG. 9. Actually, each sub-element of each synaptic element 1208 may be implemented as a memristor.

A skilled person may understand that the higher the number of sub-elements or memristors within each synaptic element 1208 is, the larger the dynamic range of each of the synaptic element 1208 is.

For completeness reasons, FIG. 13 shows a block diagram of an embodiment of the inventive method 1300 for achieving a collective task. Each element comprises a plurality of sub-elements. The method comprises selecting, 1302, one of the sub-elements of each element at a point in time based on a global clock, wherein each sub-element relates to one list element of an ordered circular list, and combining, 1304, sub-actions performed by a portion of the sub-elements of one of the elements over a predefined period of time. Each sub-element performs one of the sub-actions.

Embodiments of the invention may be implemented together with virtually any type of computer, regardless of the platform being suitable for storing and/or executing program code. FIG. 14 shows, as an example, a computing system 1400 suitable for executing program code related to the proposed method.

The computing system 1400 is only one example of a suitable computer system and is not intended to suggest any limitation as to the scope of use or functionality of embodiments of the invention described herein. Regardless, computer system 1400 is capable of being implemented and/or performing any of the functionality set forth hereinabove. In the computer system 1400, there are components, which are operational with numerous other general purpose or special purpose computing system environments or configurations. Examples of well-known computing systems, environments, and/or configurations that may be suitable for use with computer system/server 1400 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 1400 may be described in the general context of computer system-executable instructions, such as program modules, being executed by a computer system 1400. Generally, program modules may include routines, programs, objects, components, logic, data structures, and so on that perform particular tasks or implement particular abstract data types. Computer system/server 1400 may be practiced in distributed cloud computing environments where tasks are performed by remote processing devices that are linked through a communications network. In a distributed cloud computing environment, program modules may be located in both local and remote computer system storage media including memory storage devices.

As shown in the figure, computer system/server 1400 is shown in the form of a general-purpose computing device. The components of computer system/server 1400 may include, but are not limited to, one or more processors or processing units 1402, a system memory 1404, and a bus 1406 that couples various system components including system memory 1404 to the processor 1402. Bus 1406 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 1400 typically includes a variety of computer system readable media. Such media may be any available media that is accessible by computer system/server 1400, and it includes both, volatile and non-volatile media, removable and non-removable media.

The system memory 1404 may include computer system readable media in the form of volatile memory, such as random access memory (RAM) 1408 and/or cache memory 1410. Computer system/server 1400 may further include other removable/non-removable, volatile/non-volatile computer system storage media. By way of example only, storage system 1412 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 1406 by one or more data media interfaces. As will be further depicted and described below, memory 1404 may include at least one program product having a set (e.g., at least one) of program modules that are configured to carry out the functions of embodiments of the invention.

Program/utility 1414, having a set (at least one) of program modules 1416, may be stored in memory 1404 by way of example, and not limitation, as well as an operating system, one or more application programs, other program modules, and program data. Each of the operating system, one or more application programs, other program modules, and program data or some combination thereof, may include an implementation of a networking environment. Program modules 1416 generally carry out the functions and/or methodologies of embodiments of the invention as described herein.

The computer system/server 1400 may also communicate with one or more external devices 1418 such as a keyboard, a pointing device, a display 1420, etc.; one or more devices that enable a user to interact with computer system/server 1400; and/or any devices (e.g., network card, modem, etc.) that enable computer system/server 1400 to communicate with one or more other computing devices. Such communication can occur via Input/Output (I/O) interfaces 1414. Still yet, computer system/server 1400 may communicate with one or more networks such as a local area network (LAN), a general wide area network (WAN), and/or a public network (e.g., the Internet) via network adapter 1422. As depicted, network adapter 1422 may communicate with the other components of computer system/server 1400 via bus 1406. It should be understood that although not shown, other hardware and/or software components could be used in conjunction with computer system/server 1400. Examples, include, but are not limited to: microcode, device drivers, redundant processing units, external disk drive arrays, RAID systems, tape drives, and data archival storage systems, etc.

Additionally, the system 100 for achieving a collective task may be attached to the bus system 1406.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus', and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus', or another device to cause a series of operational steps to be performed on the computer, other programmable apparatus or other device to produce a computer implemented process, such that the instructions which execute on the computer, other programmable apparatus', or another device implement the functions/acts specified in the flowchart and/or block diagram block or blocks.

The flowcharts and/or block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A system for achieving a collective task, said system comprising a plurality of elements, wherein each element comprises a plurality of memristors, said system also comprising
    a memory storing program instructions;
    hardware processor coupled to the memory and running said program instructions to configure said hardware processor to:
    select one of said memristors of each element at consecutive clock iterations based on a global clock, wherein each memristor is selected from an ordered circular list of memristors at an increment rate, and a number of said memristors in said ordered circular list and the increment rate for selecting a memristor from said ordered circular list ensure that at each consecutive clock iteration, at least one selected memristor is different; and
    combine sub-actions performed by a portion of said memristors of one of said elements over a predefined period of time, wherein each memristor performs one of said sub-actions.

2. The system according to claim 1, wherein said element is a synaptic element of a neural network.

3. The system according to claim 1, wherein said memristor is selected from the group consisting of: a phase change memristor, an electro-ionic memristor and a spintronic memristor.

4. The system according to claim 2, wherein said collective task is storing a synaptic weight of said synaptic element of a neural network.

5. The system according to claim 1, wherein a total number of memristors of said elements is equal for each element.

6. The system according to claim 1, wherein said elements are identical and wherein said memristors per element are identical.

7. The system according to claim 1, wherein a total number of memristors selectable from said ordered circular list is co-prime to an increment rate for said ordered circular list.

8. The system according to claim 2, wherein a total number of elements in network is co-prime to the total number of memristors selectable from said ordered circular list.

9. The system according to claim 1, wherein said element is a robot.

10. The system according to claim 1, wherein said element is a storage element.

11. The system according to claim 1, wherein said element is a sensor.

12. A computer-implemented method for achieving a collective task with a plurality of elements, wherein each element comprises a plurality of memristors, said method comprising:
    selecting, using a programmed hardware processor, one of said sub-elements of each element at consecutive clock iterations based on a global clock, wherein each memristor is selected from an ordered circular list at an increment rate, and a number of said memristors of said ordered circular list and the increment rate for selecting a memristor from said ordered circular list ensure that at each consecutive clock iteration, at least one selected memristor is different; and
    combining, using said hardware processor, sub-actions performed by a portion of said memristor of one of said elements over a predefined period of time, wherein each memristor performs one of said sub-actions.

13. The method according to claim 12, wherein said element is a synaptic element of a neural network.

14. The method according to claim 12, wherein said memristor is selected from the group consisting of: a phase change memristor, an electro-ionic memristor and a spintronic memristor.

15. The method according to claim 12, wherein said collective task is storing a synaptic weight of said synaptic element of a neural network.

16. The method according to claim 12, wherein a total number of memristors of said elements is equal for each element.

17. The method according to claim 12, wherein said elements are identical and wherein said memristors per element are identical.

18. The method according to claim 12, wherein a total number of memristors selectable from said ordered circular list is co-prime to an increment rate for said ordered circular list.

19. The method according to claim 13, wherein a total number of elements in network is co-prime to the total number of memristors selectable from said ordered circular list.

20. The method according to claim 12, wherein said element is a robot and/or wherein said element is a storage element or, wherein said element is a sensor.

21. A computer program product for achieving a collective task with a plurality of elements, wherein each element comprises a plurality of memristors, wherein each memristor relates to one list element of an ordered circular list, said computer program product comprising:

a non-transitory computer readable storage medium having program instructions embodied therewith, said program instructions being executable by one or more computing systems to cause said one or more computing systems to:

select one of said memristors of each element at consecutive clock iterations based on a global clock, wherein each said memristor is selected from an ordered circular list of memristors at an increment rate, and a number of said memristors in said ordered circular list and the increment rate for selecting a memristor from said ordered circular list ensure that at each consecutive clock iteration, at least one selected memristor is different; and combine sub-actions performed by a portion of said memristors of one of said elements over a predefined period of time, wherein each memristor performs one of said sub-actions.

* * * * *